June 11, 1929.　　　P. BRASHER　　　1,716,616
APPARATUS FOR USE IN CONNECTION WITH WATER WAVES
Filed July 22, 1927
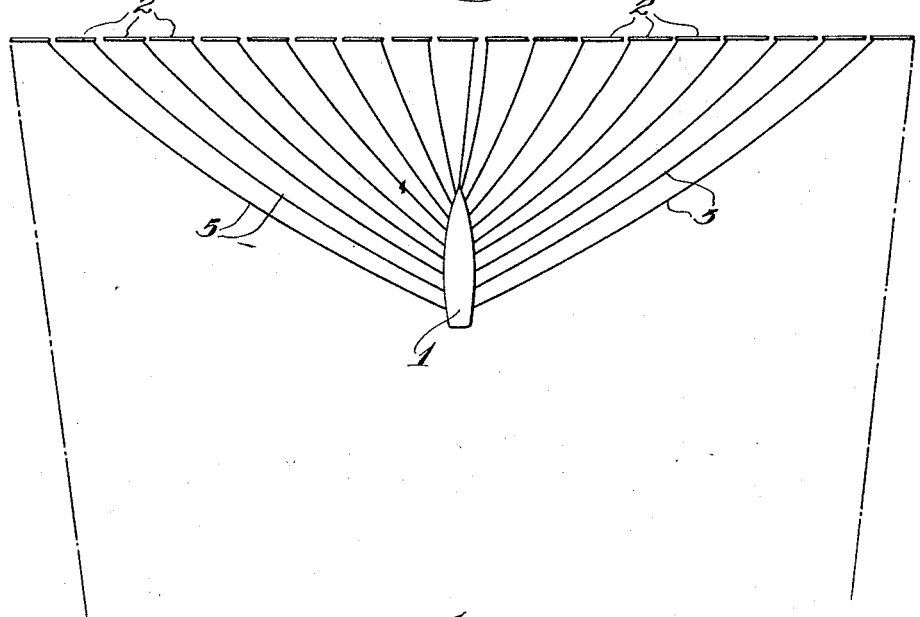
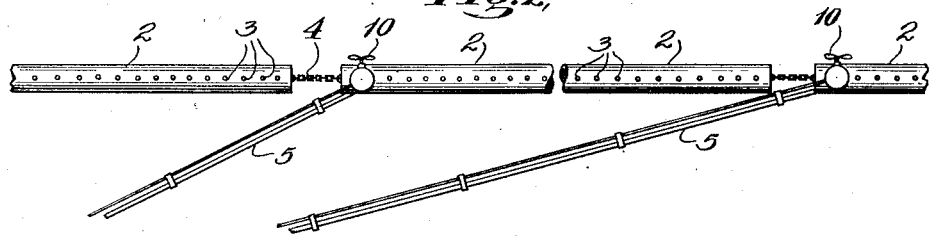
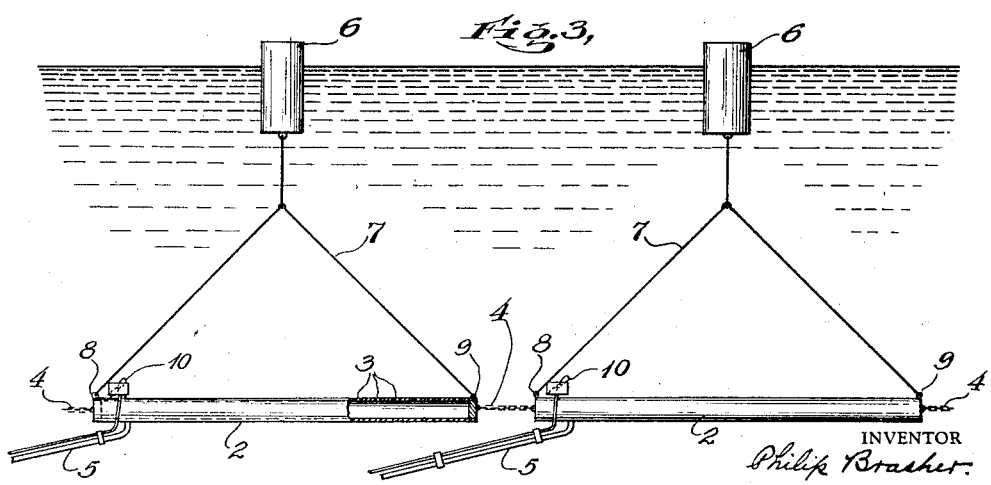
INVENTOR
Philip Brasher
BY
Kiddle and Margeson
ATTORNEYS Patented June 11, 1929.

1,716,616

UNITED STATES PATENT OFFICE.

PHILIP BRASHER, OF PRINCETON, NEW JERSEY.

APPARATUS FOR USE IN CONNECTION WITH WATER WAVES.

Application filed July 22, 1927. Serial No. 207,591.

My invention relates to a method of and apparatus for use in connection with water waves, and while adapted for the protection of objects, such as beaches, bulkheads, piers, lighthouses and the like, from the action of the waves of the ocean or other bodies of water, is more particularly adapted for creating a relatively quiescent area at any location desired with respect to a body of water.

My improved method and apparatus provide a simple and effective means for causing the collapse of water waves of any height, such as found at sea, for example, the area in which the waves are collapsed being limited only by the size of the apparatus employed. For example, it is possible as well as practicable to cause the collapse of ocean waves for a dstance of a half mile, thereby to produce a quiescent area roughly triangular in shape and having a base half a mile long and an altitude of substantially the same length.

My improved method and apparatus are particularly well adapted for use in flights over the ocean or other large bodies of water, inasmuch as the apparatus may be placed in any desired location with respect to the body of water to be crossed, does not have to be anchored or moored, and by providing the comparatively calm or quiescent area of water as above mentioned, enables a machine making the flight to land with safety on the water for the purpose of refueling or making repairs or for any other reason.

As will be pointed out hereinafter, my apparatus is so designed that the same will lie across the wind and the calm area produced by the collapse of the water waves will be to leeward, thereby especially adapting the apparatus for use in air flights wherein it is desirable under present conditions for the machine to land headed into the wind.

In my prior Patent No. 843,926, dated February 12, 1907, I provided apparatus for protecting beaches, for example, from wave action and in that patent provided a series of pipes or conduits secured to the sea bottom, proper rigid connections being made therefrom to a source of compressed air located on land, the bubbles formed by the release of air under pressure pumped into the conduits rising to the surface of the water to cause the collapse of the waves. The present apparatus differs from that type in that the same may be located, as above noted, in any location with respect to a body of water by reason of the fact that the same does not rest on nor is secured to the sea bottom, nor is it necessary to moor or anchor the same.

In brief, the apparatus of the present invention comprises a series of pipes or conduits or receivers attached to each other and suspended, submerged to any desired depth, from a float such as a buoy, air or other elastic fluid under pressure being supplied to these conduits from a suitable floating structure hereinafter referred to as a ship, through air lines which are preferably composed of flexible metallic hose to permit of relative movement between the conduits and the ship. Means may be provided for controlling the supply of air or other elastic fluid to each section of conduit independently of all the other sections so that the discharge of air from the conduits is selectively controlled and regulated. The floating structure or ship will be provided with motive power to enable the same to be moved from place to place and also to enable the same to be held more or less stationary in any desired location, thereby to eliminate the necessity of anchoring, which is not feasible where the water is of great depth.

In addition to the foregoing, I provide each unit of the conduit or pipe or receiver with propelling means driven by compressed air or other elastic fluid under pressure, these propellers functioning to draw the conduits away from the ship and maintain them in the desired and preferred alignment. I might say at this point that the conduits or receivers may extend for a half mile and are preferably positioned a substantial distance in advance of the ship, say, for example, 200'. The type of conduit employed may depend somewhat upon the character of the work to be done, but in most cases the same may comprise an iron pipe 4" inside diameter and from 100' to 200' long, each section of pipe being suitably plugged at each end and provided in one face with a series of perforations which may be, for example, ¼" holes spaced 6" apart.

In the accompanying drawings, wherein I have shown an embodiment of my invention, Fig. 1 shows the same more or less diagrammatically and in plan;

Fig. 2 is also a plan view on an enlarged scale with respect to the showing of Fig. 1, and illustrates in more or less detail the conduits and air line connections thereto; and Fig. 3 shows a section of the pipes or conduits submerged and suspended from floats or buoys.

Referring to the drawings in detail, 1 designates a floating structure which I will refer to as a ship. This ship, as above noted, will be supplied with motive power and will also be provided with the necessary apparatus for compressing the air or other elastic fluid which is to be supplied to the apparatus.

If desired, the floating structure may provide a landing platform suitable for the landing of air machines, as the same will be in comparatively quiescent water, as will hereinafter be pointed out.

2 designates a plurality of conduits or pipes or receivers for the air or other elastic fluid which is compressed by the apparatus on the ship 1. Each end of each section of conduit is plugged, while one face of each section is perforated as indicated at 3. These conduits or receivers may be of any length found preferable, as from 100' to 200', for example, and adjacent conduits are attached to each other flexibly by means of a chain 4 or other suitable connection.

Air or other elastic fluid under pressure is fed to these conduits 2 through air lines 5, which may be flexible metallic hose, for example, one end of each length of hose being suitably connected to the conduit while the other end is suitably connected to the compresser carried by the ship 1. As above mentioned, the supply of compressed fluid to each conduit may be independently controlled so that air under pressure may be fed to any one or all of the conduits as desired, as well as continuously or intermittently, as desired.

6 designates a plurality of floats or buoys from which the conduits are suspended by a bridle 7, such as a wire cable, for example, this bridle being attached to the ends of each section of conduit, as indicated at 8 and 9.

The air lines 5 are preferably connected in all cases to the end of each conduit adjacent the ship 1.

In addition to all of the foregoing, each conduit 2 is provided with a propelling apparatus in the form of a propeller 10, one or more being provided for each conduit as desired, disposed at the end of each section of conduit to which the hose 5 is attached. While the disposition of the propellers 10 may be varied, I prefer to dispose these propellers as illustrated in Fig. 2, that is to say, in advance of each conduit section, so that these sections will be drawn forward rather than pushed. These propellers are operated by compressed air or other elastic fluid under pressure, the connection to these propellers being through hose connection extending from the propeller structure to the ship 1. The same source of power may be employed for these propellers as is used to supply fluid under pressure to the conduit sections. The purpose of this propelling apparatus is to enable the line of conduits or receivers to be properly positioned, with the minimum of effort, with respect to the ship 1, and it will be obvious that when the conduit sections are first placed in the water from the ship, the propellers 10 may be set into operation so as to carry the conduits away from and in advance of the ship, and these propellers may be operated from time to time to maintain the conduits in this position. While I have shown the conduits 2 disposed in line with each other, it is to be understood that this disposition may be varied, if desired. With the conduits disposed as illustrated and with the ship, landing platform or floating structure 1 disposed as illustrated, the conduits are lying across the wind and the floating structure headed into the wind. When air or other elastic fluid under pressure is fed to the conduits and forced therefrom through the openings 3 therein, air and water will be forced to the surface of the water to provide an upwardly moving wall or dam, so to speak, against which the approaching waves will dash and be thereby collapsed, so that actually the air forced upwardly through the conduit sections may be said to provide a compressed fluid breakwater, against which the waves dash and are caused to collapse. Back of this breakwater there will be a relatively quiescent area or zone of water, roughly triangular in shape, the base of this triangular area being equal to the combined length of the conduits 2 while the altitude of the triangle will be substantially of the same length. With a half mile of conduits in operation and with these conduits disposed 200' in advance of the ship 1, it will be seen that a quiescent area of substantial proportions is provided which is sufficiently large to accommodate an airship, not only providing ample space for permitting the ship to land without difficulty, but sufficient space to permit of the ship maneuvering and rising from the water again after refueling or repairing, etc. In this connection, as I have above noted, the fact that the ship 1 is at the windward end of the quiescent area or adjacent the windward end is of advantage inasmuch as it permits of an airship landing on the water headed into the wind, which with present-day machines is desirable and with some types of machines practically necessary. It will be seen also that the floating structure 1 may very well be a landing float on which an airship may land, inasmuch as the same will obviously be lying steady by reason of the quiescent area of water provided, as above explained.

The depth to which the conduits 2 are submerged will depend a great deal upon the location of the apparatus as well as upon the maximum height of the waves to be collapsed. In any event, however, I prefer to submerge the conduits below the plane of disturbance of the water by surface waves.

From all of the foregoing, it will be seen that I have provided a method of and apparatus for providing a quiescent zone or area at any desired location with respect to a body of water, as for example the ocean, and while I have shown and described a specific embodiment of my invention, it is to be understood that changes may be made therein within the purview thereof. I wish it to be understood also that any dimensions above referred to are merely by way of illustration and for clarity of description and not for purposes of limitation.

What I claim is:

1. An apparatus for effecting a collapse of water waves comprising a floating structure including submerged conduits for an elastic fluid, and means for effecting a release from said conduits of the elastic fluid in the path of the waves to be collapsed.

2. An apparatus for effecting a collapse of water waves and to provide an extended comparatively quiescent area, comprising in combination a float, a conduit suspended therefrom, and positioned below the surface of the water in advance of the waves to be collapsed, a floating structure for supplying a compressed elastic fluid to said conduit, said conduit being constructed to permit of the release therefrom of the fluid supplied thereto from said floating structure.

3. An apparatus for effecting a collapse of water waves and the production of a relatively quiescent area, comprising in combination a series of suspended submerged conduits or receivers, flexible means for attaching adjacent conduit sections to each other, a float to which each conduit section is flexibly attached and by which each section is suspended in submerged condition, a floating structure and flexible hose connections therefrom to each of said conduits for supplying a fluid to said conduits under pressure, each of said conduits being perforated to permit of the escape of the compressed fluid therefrom into the path of the waves to be collapsed.

4. An apparatus for effecting the collapse of water waves, comprising in combination a plurality of floating conduits, a means for supplying air under pressure to each of said conduits, each conduit being provided with perforations for the escape of the compressed air into the water in advance of the waves to be collapsed.

5. An apparatus of the class described, comprising in combination a conduit, means for suspending same submerged in water, a source of supply of air or other elastic fluid under pressure for said conduit, and means for propelling said conduit with respect to said source of supply.

6. An apparatus of the class described, comprising in combination a plurality of conduits or receivers, means for suspending the same submerged in water, a floating structure to which each conduit is connected by a flexible connection, and means for propelling each conduit relatively to said floating structure to effect any desired disposition of the conduits relatively to said structure.

7. An apparatus of the class described, comprising in combination a plurality of conduits, a flexible connection between adjacent conduits, means for supplying air under pressure to each conduit independently, and an unanchored float for each conduit flexibly connected thereto and by which each conduit is held suspended in water at a predetermined depth.

8. An apparatus of the class described, comprising in combination a plurality of conduits flexibly connected to each other at their adjacent ends, independently operable propelling mechanism for each conduit, a float for each conduit, and a bridle by which each conduit is suspended in a submerged condition from each float.

9. An apparatus of the class described, comprising in combination a plurality of conduits, each conduit being closed at each end and provided intermediate its ends with a plurality of perforations, a source of compressed air, a flexible connection comprising metallic hose for supplying air to said conduits independently, flexible connections connecting adjacent conduit sections, propelling mechanism for each conduit, said propelling mechanisms receiving power from said source of compressed air, and a float for each conduit for suspending the same submerged in water.

10. An apparatus of the class described, comprising in combination a plurality of flexibly connected submerged mobile conduits, a float for sustaining each conduit, and propelling mechanism for each conduit whereby the conduits and floats may be propelled to predetermined relative positions.

11. An apparatus of the class described, comprising in combination a plurality of submerged air-receiving conduits, a flexible connection between adjacent conduits, propelling mechanism for each conduit, a float for each conduit for sustaining the conduits, a floating structure for supplying air under pressure, flexible means connecting the floating structure to each conduit, said flexible means being independently controlled to supply air under pressure, as desired, to said conduits selectively, said propelling mechanism being operative to maintain the conduits in predetermined relation to said floating structure.

This specification signed this 20th day of July, 1927.

PHILIP BRASHER.